March 10, 1925.                                              1,528,879
C. J. HOLSLAG
ELECTRIC ARC WELDING ELECTRODE
Original Filed Oct. 15, 1918
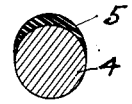
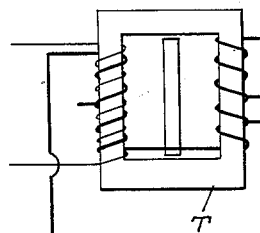
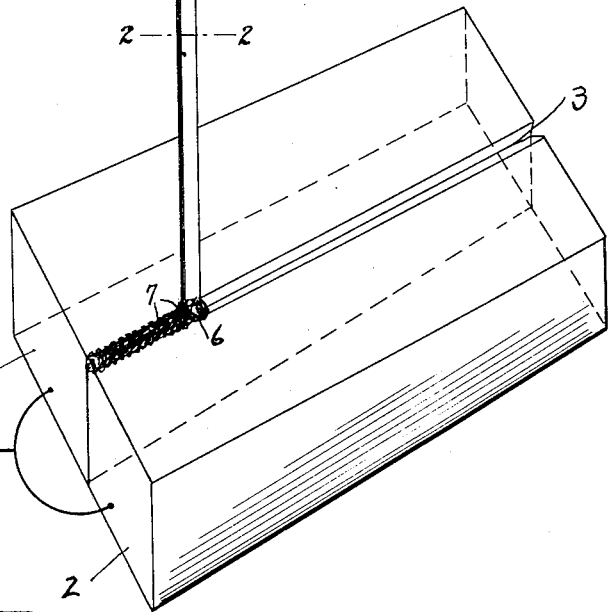
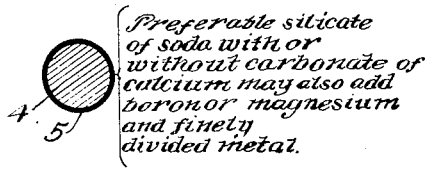
Preferable silicate of soda with or without carbonate of calcium may also add boron or magnesium and finely divided metal.
INVENTOR
CLAUDE J. HOLSLAG.
BY Albion D. T. Libby
ATTORNEY Patented Mar. 10, 1925.

1,528,879

UNITED STATES PATENT OFFICE.

CLAUDE J. HOLSLAG, OF SOUTH ORANGE, NEW JERSEY, ASSIGNOR TO ELECTRIC ARC CUTTING & WELDING COMPANY, OF NEWARK, NEW JERSEY.

ELECTRIC-ARC-WELDING ELECTRODE.

Original application filed October 15, 1918, Serial No. 258,197. Divided and this application filed October 25, 1924. Serial No. 746,256.

*To all whom it may concern:*

Be it known that I, CLAUDE J. HOLSLAG, a citizen of the United States, residing at South Orange, in the county of Essex, State of New Jersey, have invented certain new and useful Improvements in Electric-Arc-Welding Electrodes, of which the following is a description, reference being had to the accompanying drawing and to the figures of reference marked thereon.

This invention relates to welding or repairing, using a metallic electrode by means of an electric arc produced by any suitable source of current either direct or alternating. However, I prefer to use alternating current on account of its numerous advantages, many of which are set forth in my Patent 1,305,362 issued June 3, 1919.

This appplication is a division of my application Serial No. 258,197 filed October 15, 1918 and also relates back to an earlier application Serial No. 239,447 filed June 11, 1918, which was consolidated with said first mentioned application.

In the process of electric arc welding and repairing slag covered electrodes have been used to some extent, also complete envelopes or sleeves of some nature have been used around the welding electrode to hold the arc and also to make "slag." I have found these schemes to be entirely unnecessary in the operation of my method of electric arc welding set forth in the above mentioned application, and detrimental to good welding in that the "slag" or "envelope" gets into the puddle or ahead of the arc tending to put the same out and to cause porous or spongy welds, particularly so when direct current is used. In any process or method of welding I do not want "slag" in or around the weld, but rather a very thin non-oxidizing coating, which is readily removable, applied to the cooling metal closely adjacent to the puddle as it and the arc advances, to prevent oxidization and secure a smooth weld; neither do I require an envelope or sleeve of any sort to sustain the arc.

It is the object of this invention to set forth a method of electric arc welding and repairing which is free from these objections and which produces a weld that is smoother and more uniform than that produced by "slag" or "envelope" covered electrodes or even bare electrodes, as will be hereinafter pointed out.

It is, therefore, the object of this invention to provide an electrode that will produce a weld that is smooth, stronger and more uniform than that produced by a "slag" or "envelope" covered electrode or even bare electrodes.

By way of illustration, Figure 1 of the drawing attached hereto shows somewhat diagrammatically the manner of putting my invention into practice, while Figure 2 shows on an enlarged scale a section on the line 2—2 of the welding electrode shown in Fig. 1.

Figure 3 is an enlarged section of my electrode with the coating all the way around the electrode.

In Fig. 1 I have shown a transformer T of the type shown and described in my patent previously referred to, which is capable of delivering the arc voltage directly at the terminals of the transformer without any intermediate resistances, inductances, etc. 1 and 2 illustrate two metal plates which are to be welded along the line 3. 4 is a metal electrode of suitable composition to make the weld, having a partial coating 5 carried thereon as shown in Figs. 1 and 2 or a full coating as shown in Fig. 3.

I have found after many experiments that silicon, or in its more common form, silica, acts as a very quieting agent, even better than aluminum, on the molten metal closely adjacent the puddle formed by the arc; that is to say, boiling is prevented by the presence of silica. I, therefore, apply to one side only of the welding electrode, a coating containing preferably a considerable amount of silica. I have found that such a coating is readily applied when the silica is in the form of silicate of soda. In some cases I have mixed with the silicate of soda, precipitated carbonate of calcium, and for certain classes of work I have used in addition to the above mentioned ingredients a small amount of a material having great affinity for oxygen, such as boron or magnesium, however these materials having great affinity for oxygen may or may not be used, depending on the cleanliness of the metal that is to be welded or repaired. This partial coating may also include ingredients to be applied in such a way as to produce in the weld, alloys of steel or other alloys so that the weld is the same as the metals to be welded or the weld can be made of special constituency for special purposes, as for example, copper deposited with the steel tends to reduce corrosion to a large extent.

It will be readily perceived that the silicate of soda or a mixture of silicate of soda and corbonate of calcium, with or without the material having great affinity for oxygen, as hertofore mentioned, produces a very thin mixture which is adapted to be dipped, sprayed or brushed onto the welding electrode. I prefer to apply this coating on a part of the circumference of the electrode, leaving the other part bare, but inasmuch as the coating applied is very thin and contains no slag it may, for certain classes of work, be applied over the entire surface of the rod in which case, however, it, in no sense, constitutes a sleeve for holding the arc.

In operation, I take a welding electrode which has been covered and dried, as above indicated, and connect the same to one terminal of the source of current, the other terminal of which is connected to the work to be welded or repaired and after striking an arc with the bare side of the electrode I advance the bare side of the electrode along the seam, joint or piece to be welded or repaired. An electrode so constructed and operated desposits the covering not into the puddle 6 or ahead of it, as in other types of electrodes, but on over the cooling metal closely adjacent the puddle as at 7 whereby the oxygen in the air or other occluded gases as well as the material itself are kept from the weld, thereby preventing a porous weld. There is no "slag" produced by such a covering, as I have described, and the covering is readily brushed off with a metal or stiff brush, whereas when "slag" covered eletrodes are used the "slag" gets ahead of the arc and into the puddle tending to put out the arc and to cause a more or less porous weld, besides the "slag" has to be chipped off with a hammer or with a hammer and chisel.

It will be readily observed that the electrode herein described is very cheaply prepared, which is most important when it is understood that in metallic arc welding on ships, locomotives and such work, thousands of feet of welding electrodes are used up daily. Furthermore, since in my preferred form of electrode, one half of the electrode is bare no time is lost in striking the arc as when "slag" or "envelope" covered electrodes are used.

While I have shown and described an electrode for metallic arc welding having a coating containing a large amount of silica, yet I do not wish to be limited to this particular substance or a mixture of the other substances hereinbefore mentioned as regards my preferred form having a partial coating, as others may later be found which will work as well, but I believe I am the first to discover the advantages of and to use a partially coated electrode no matter what the make up of the coating is.

Having thus described my invention what I claim is:

1. An electrode for use in electric arc welding and repairing comprising a metal rod having a partial coating consisting principally of silica, preferably in the form of silicate of soda.

2. An electrode for use in electric arc welding and repairing comprising a metal rod having a coating consisting principally of silica, preferably in the form of silicate of soda, said coating having mixed therewith some metal in a finely divided state.

3. An electrode for use in electric arc welding and repairing comprising a metal rod having a partial coating consisting principally of silica, preferably in the form of silicate of soda, said partial coating having mixed therewith some metal in a finely divided state.

4. An electrode for use in welding and repairing, comprising a metal rod having a coating of appreciable thickness consisting only of silicate of soda.

5. An electrode for use in electric arc welding and repairing, comprising a metal rod having a thin coating consisting principally of silica, preferably in the form of silicate of soda.

6. The method of electric arc welding or repairing which consists in establishing an arc between the material to be welded or repaired constituting one electrode and the welding or repair metal constituting the other electrode, said welding or repair electrode carrying only on a portion of its peripheral surface a covering of material containing an excess of silica which is deposited only over the cooling material of the weld as and for the purpose described.

7. The method of electric arc welding or repairing which consists in establishing an arc between the material to be welded or repaired constituting one electrode and the welding or repair metal constituting the other electrode, said welding or repair electrode carrying a partial covering saturated with silicate of soda which is deposited over the molten metal of the weld as the welding or repair electrode is drawn along the metal to be welded or repaired.

8. The method of electric arc welding and repairing which consists in providing a welding or repair electrode connected to one terminal of a source of electric current and having a partial covering containing silica, striking an arc between the uncovered portion of the electrode and the material to be welded or repaired connected to the other terminal of the source of current, advancing the uncovered portion of the electrode in the direction of the joint, seam, or piece to be welded or repaired, whereby the covering material on the welding or repair electrode is excluded from the puddle of molten metal and deposited as a covering over the cooling material behind the puddle.

9. The method of electric arc welding and repairing which consists in providing a welding or repair electrode, connected to one terminal of a source of electric current, and having a covering containing silica which is adapted to be sprayed or painted on to a portion of said electrode, striking an arc between the uncovered portion of the said electrode and the material to be welded or repaired connected to the other terminal of the source of electric current, moving the uncovered portion of the electrode and arc along the seam, joint, or place to be welded or repaired in such a way that the covering is deposited over the rapidly cooling metal of the weld in such a way as to quiet the reaction thereof as and for the purposes described.

10. A metal arc welding electrode having a coating of appreciable thickness consisting principally of silicate having a high electron emissivity when heated, the resultant scale forming on the finished weld tending to peel off as the metal cools.

11. An electrode for use in arc welding and repairing comprising a metal rod having a coating of appreciable thickness consisting only of a silicate.

In testimony whereof, I affix my signature.

CLAUDE J. HOLSLAG.